United States Patent

Heinonen et al.

Patent Number: 6,094,573
Date of Patent: Jul. 25, 2000

[54] SYSTEM AND A METHOD FOR SELECTIVE DATA RETRIEVAL FROM A REMOTE DATABASE ON BASIS OF CALLER LINE IDENTIFICATION AND USER SPECIFIC ACCESS CODES

[75] Inventors: Pekka Heinonen; Harri Okkonen, both of Espoo, Finland

[73] Assignee: Nokia Mobile Phones Limited, Espoo, Finland

[21] Appl. No.: 08/968,678

[22] Filed: Nov. 12, 1997

[30] Foreign Application Priority Data

Nov. 12, 1996 [FI] Finland ................................. 964538

[51] Int. Cl.[7] .................................................. H04M 11/10
[52] U.S. Cl. ........................ 455/412; 455/414; 379/88.25
[58] Field of Search ..................................... 455/412, 413, 455/414, 415, 517; 379/67.1, 88.2, 88.21, 88.25

[56] References Cited

U.S. PATENT DOCUMENTS

| | | | |
|---|---|---|---|
| 4,218,738 | 8/1980 | Matyas et al. | 364/200 |
| 5,022,067 | 6/1991 | Hughes | 379/95 |
| 5,077,788 | 12/1991 | Cook et al. | 379/142 |
| 5,105,197 | 4/1992 | Clagett | 455/412 |
| 5,109,399 | 4/1992 | Thompson | 379/45 |
| 5,181,238 | 1/1993 | Medamana et al. | 379/95 |
| 5,255,309 | 10/1993 | Katz | 379/88 |
| 5,259,023 | 11/1993 | Katz | 379/88 |
| 5,572,576 | 11/1996 | Klausner et al. | 455/413 |
| 5,758,279 | 5/1998 | Foti | 455/412 |
| 5,781,857 | 7/1998 | Hwang et al. | 455/412 |

FOREIGN PATENT DOCUMENTS

| | | |
|---|---|---|
| WO 95/24107 | 9/1995 | WIPO . |
| WO95/24107 | 9/1995 | WIPO . |

*Primary Examiner*—Edward F. Urban
*Attorney, Agent, or Firm*—Perman & Green, LLP

[57] ABSTRACT

The present invention relates to a system and a method for retrieving information from a database (7). The object of the invention is to utilise both the information automatically transmitted at the point when the telecommunication connection is established and a code, relating to safe identification, for reliably identifying a subscriber A and for retrieving information from a correct location in the database. For this purpose, the system includes a subscriber device (1A, 1B) of the subscriber A for establishing a telecommunication connection and for managing communication during it, a data processing system (2) of a subscriber B for responding to a request for contact of the subscriber device (1A, 1B) of the subscriber A, the data processing system (2) containing the database (7) or being in contact with it, and the data processing system (2) further comprising a system for receiving an identifier (3) of the subscriber A, a system for receiving a predetermined code (4) from the subscriber A, and a system for retrieving information from the database (7) on the basis of the identifier (3) and the code (4) of the subscriber A.

11 Claims, 2 Drawing Sheets

6,094,573

SYSTEM AND A METHOD FOR SELECTIVE DATA RETRIEVAL FROM A REMOTE DATABASE ON BASIS OF CALLER LINE IDENTIFICATION AND USER SPECIFIC ACCESS CODES

FIELD OF THE INVENTION

The object of the present invention is a system for retrieving data from a database, the system including a subscriber device of a subscriber A for establishing a telecommunication connection and for managing communication during it, the device containing a user interface for displaying messages received from a data processing system of a subscriber B and for responding to them, the data processing system of the subscriber B for responding to a request for contact of the subscriber device of the subscriber A, the data processing system containing the database or being in contact with it, and the data processing system comprising means for receiving an identifier of the subscriber A.

In addition, the object of the invention is a method for retrieving data from a database, wherein a telecommunication connection is established to the subscriber A as a response to a request transmitted from the subscriber A, and the identifier of the subscriber A is received.

BACKGROUND OF THE INVENTION

The invention relates particularly to retrieving information from a database with the help of search criteria transmitted by telephone, but the method and the solution, according to the invention, can also be used in other telecommunication connections.

Normally, the subscriber A gives orally the search criteria by means of which the subscriber B manually retrieves the information. In this case, the retrieval of information is slow. In addition, unnecessary, overlapping work is being done because, in practice, the search criteria are given twice. The degree of error is also high, and incorrect information, retrieved on the basis of incorrectly given search criteria, may be handled without anyone noticing the matter at the time.

In the solution of U.S. Pat. No. 5,109,399, information is retrieved from a map database using an automatically received telephone number of a fixed, wired network as the search criteria. The problem of the presented solution is inadequate safety, e.g., when retrieving confidential information, because anyone who calls with the subscriber device of the subscriber A is capable of retrieving, from the database, the information relating to the telephone number. Thus, it is impossible to retrieve any confidential information. Another problem is dependence on the device and the location, because the subscriber A can only retrieve the correct information from the database when calling from a subscriber device located in a specific place and connected to a fixed network.

A similar solution is described in U.S. Pat. No. 5,077,788 in which location information about a calling station is searched from a computer memory based on the number of the calling station.

Publication WO 95/24107 discloses a cellular telephone fraud control system, in which a switch of a mobile telephone system receives both the CLI (Caller Line Identification) and a Caller Authentication Number (CAN) input by the user of the mobile telephone for verifying an authorized user. When an authorized user is verified a call from the mobile telephone is connected.

SUMMARY OF THE INVENTION

The purpose of the present invention is to offer for use a safe system that automatically retrieves, from the database, the correct data relating to the subscriber A, allowing access to different services. The system is not dependent on the location of the subscriber device of the subscriber A. This object is achieved by means of a system, according to the invention, wherein the data processing system of the subscriber B receives the identifier CLI (Caller Line Identification) of the subscriber A, the system being characterised in the database comprises data relating to a number of different services and service users, data related to one of the users of one of the services being identified by the identifier of the subscriber A and a predetermined code, and the data processing system comprises means for receiving the predetermined code (4) from the subscriber A and means for retrieving data relating to said one service and said one user from the database on the basis of the identifier of the subscriber A and the predetermined code. Thus, the system in question can be, e.g., a patient data system and the database can be a patient database having data relating to different patients and different diseases and treatments.

In addition, the object of the present invention is a method, wherein the system that is the object of the invention can be utilised. It is characteristic of the method, according to the invention, that the database comprises data relating to a number of different services and service users, data related to one of the users of one of the services being identified by the identifier of the subscriber A and a predetermined code, one predetermined code is received from the subscriber A, and data relating to said one service and said one user is retrieved from the database as a response to receiving said predetermined code and the identifier of subscriber A.

The invention is based on the idea of utilising both the information (i.e. the CLI) automatically transmitted at the point when the telecommunication connection is established and a code, relating to safe identification, for reliably identifying the subscriber A and for retrieving information, from the database, from a correct location indicated by the combination of the identification numbers. Thus, a significant advantage of the solution, according to the invention, is the safe and quick retrieval of information from the correct location in the database. Moreover, information related to different services or different persons can be accessed by the same subscriber. Thereby, in a family each family member may access his/her personal data from a database with a common subscriber number (subscriber A) without the need to have a separate telephone for each family member.

A tapping error in connection with the giving of the code causes the database not to open. The same thing happens, if the code gets into the wrong hands and it is, therefore, used together with a wrong identifier. Another advantage of the solution, according to the present invention, is that it can be used for opening all kinds of databases, also those containing highly confidential information. The solution, according to the invention, enables services provided by an intelligent network to be utilised in choosing the identifier of the subscriber A and in the manner the code is given, e.g., so that the identifier CLI of the subscriber A is an invoicing number given by the subscriber A to the subscriber device through an intelligent card. In addition, the solution, according to the invention, provides for the technology, used in the telecommunication connection, to be chosen freely. The telecommunication connection can be based on fixed connections, wireless communication or their combinations. Wireless communication can be implemented, e.g., by means of radio communication or by utilising infrared rays of light. Yet another advantage of the solution, according to the invention, is that the subscriber A may have several codes and, by selecting a particular code, he selects the exact location in the database whereto his business is related at that particular time of contact.

In a preferred embodiment of the present invention, the subscriber device of the subscriber A is a mobile station of the GSM system (Global System for Mobile Communications), utilising wireless communication, and the identifier CLI is a MSISDN number (Mobile Station ISDN number) relating to a SIM card (Subscriber Identity Module) according to the GSM system. This embodiment is preferable because, in the GSM system, the code is transferred encrypted over the radio interface. In addition, one advantage of the embodiment is that it does not restrict the retrieval of information on the basis of the subscriber device of the subscriber A or its location. For example, information can be retrieved from the database, while travelling on the other side of the globe, using a borrowed subscriber device, wherein the correct SIM card has been installed.

The preferred embodiments of the system and the method, according to the invention, become apparent from the enclosed dependent claims 2–6 and 8–10.

BRIEF DESCRIPTION OF THE DRAWINGS

In the following, the invention will be discussed in more detail with the help of a preferred embodiment, according to the invention, by referring to the enclosed figures, where.

DETAILED DESCRIPTION

Figure 1:
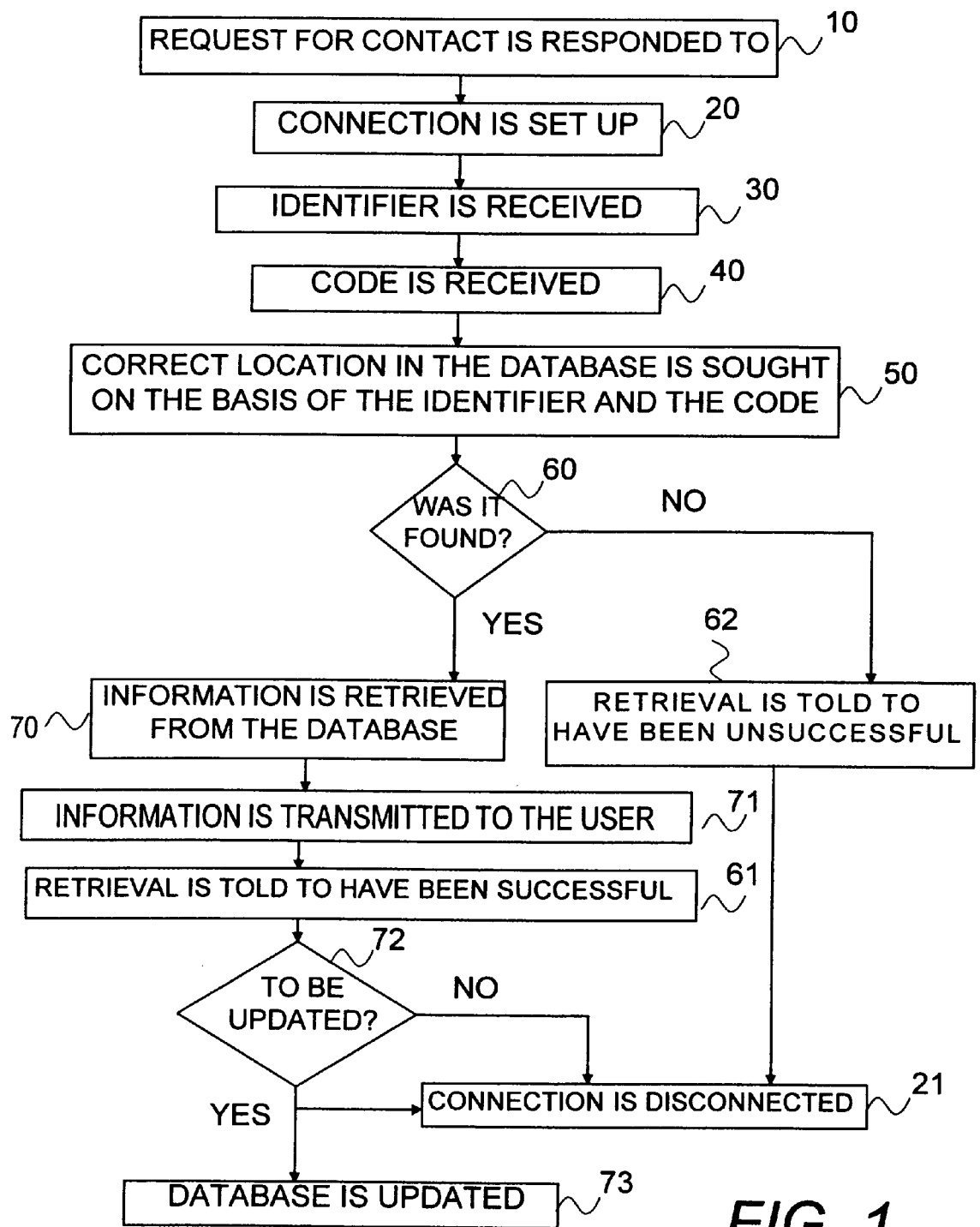
FIG. 1 illustrates a flowchart of a first preferred embodiment of a method, according to the invention.

In FIG. 1, the operations of a data processing system, according to the invention, are discussed assuming, by way of example, that the telecommunication connection is established through a telecommunication network. In FIG. 1, the operations are presented assuming that the response 10 to the request for contact, made by the subscriber A, is positive, a connection 20 is established and an identifier 30 of the subscriber A is received. The subscriber A's identifier can be a telephone number relating to a subscriber device (i.e. the CLI), an invoiced telephone number given to the subscriber device through an intelligent card or a corresponding identifier automatically transmitted to the subscriber B at the point when the connection is formed. After receiving 30 the identifier, the data processing system can ask, e.g., by means of a voice message or a short message, the subscriber A the code or the subscriber A can give it without being ask. The subscriber A can give the code, e.g., as DTMF sounds by tapping it in with the keypad of the phone. Alternatively, the code can be given through a storage location of the subscriber device containing the code or by other means supported by the network used by the telecommunication connection.

The data processing system receives a code 40 and searches, on the basis of the identifier and the code, for a correct location 50 in the database. One or more predetermined codes can be connected with a single identifier and, thus, there may be several possible correct locations to be searched for by means of the identifier, whereupon one of them will be selected by the code. For example, one and the same system can be a patient database or patient data system having a database with data on different diseases. One and the same patient can be suffering of diabetes and overweight, whereby the patient can have a first code for access to his/her data concerning diabetes and a second code for access to his/her data concerning overweight. Thereby in combination with the CLI and the first code the user gets access to his/her data on diabetes and in combination with the CLI and the second code the user gets access to his/her data on overweight. Alternatively several patients can be using the same subscriber device, and accordingly have the same CLI, but by different codes the patients would have access to their personal data only.

When the search for the correct location has ended, the data processing system informs whether or not the information was found 60. If the information was not found, the subscriber A is informed that the retrieval of information was unsuccessful 62, e.g., by means of a voice message or a short message, and the established connection is disconnected 21. Alternatively the subscriber A may be given the option to either end the call (step 21) or to be connected to a Helpdesk by pressing certain keys. If the information was found, it is retrieved from a database 70 and transmitted to a user 71 of the data processing system. This user can be for example the doctor treating the patient, whereby the doctor gets readily the data of the patient calling from subscriber A displayed on the screen his computer which is connected to the data processing system. The user (the doctor) is preferably not informed of the telecommunication connection to the subscriber A until now, because it is more meaningful for the user to work, when he is unaware of the unsuccessful attempts to retrieve information. The subscriber A is told that the information was successfully retrieved 61, e.g., by means of a voice message, a short message or by the user calling the subscriber A either at this point or before the information is retrieved from the database.

After receiving the information, the user (the doctor) and the subscriber A (the patient) communicate with each other, whereupon the user can change the information or add to it as necessary. This can be done by sending data from the database to the user, e.g. in a short message and likewise subscriber A can send data back to the database. In the GSM system the SMS messages (short messages) can be sent even simultaneously as a call is in place. When the subscriber A has concluded the matter, the data processing system wants to know whether or not the possibly changed information 72 should be updated in the database. After receiving an answer, the telecommunication connection to the subscriber A is disconnected 21. If the answer is yes, the database 73 is updated.

Figure 2:
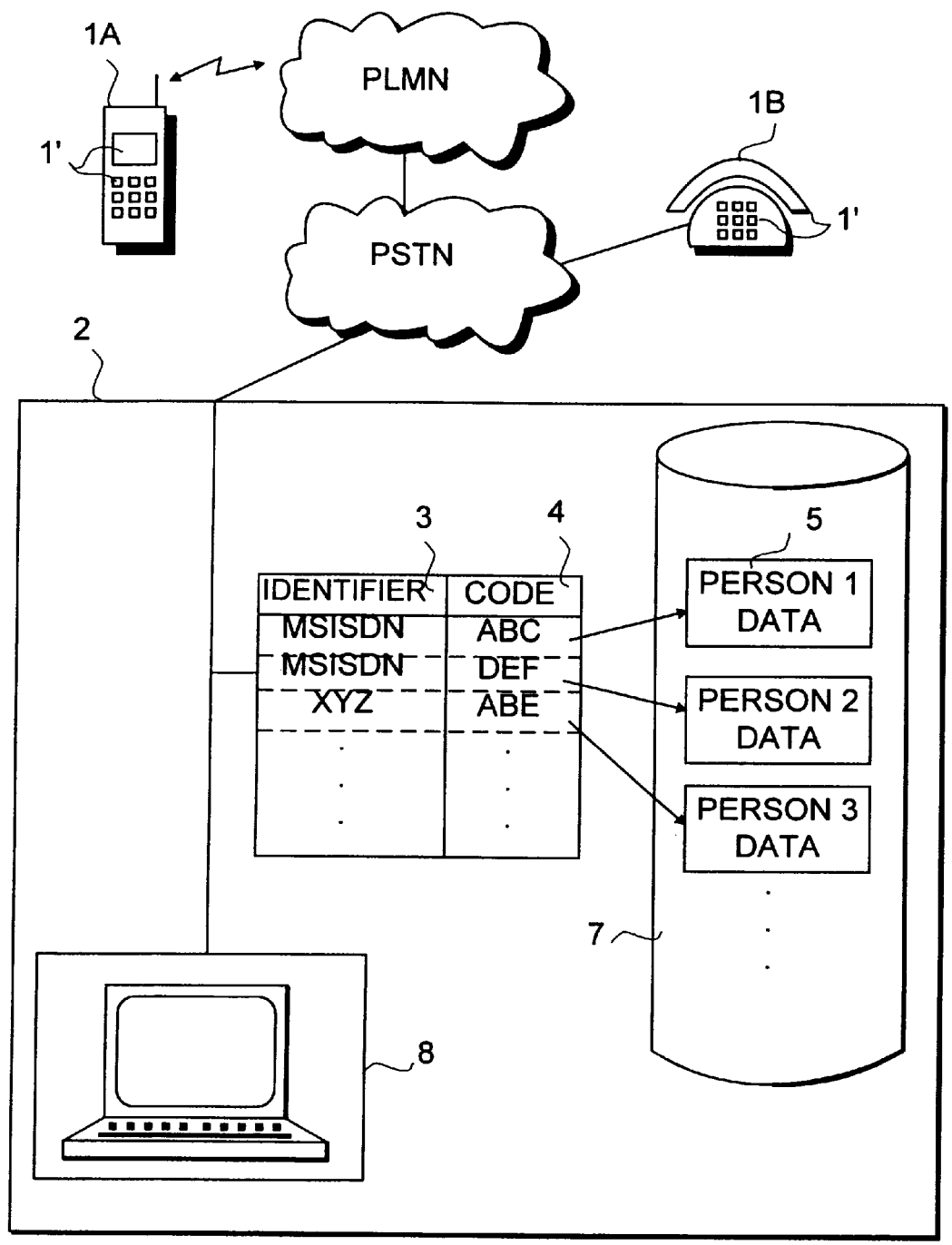
FIG. 2 illustrates a first preferred embodiment of a system, according to the invention.

FIG. 2 illustrates a first preferred embodiment of the system, according to the present invention, wherein a database 7 is a patient database. Its data 5 include, amongst others, the personal data and the case history including medication. A data processing system 2 is capable of utilising the personal data automatically filling in, e.g., by means of a printer connected to it, the relevant places on forms to be printed, such as prescription forms and referrals. This means that the personal data in the filled-in forms are always correct. The database 7 may include several databases, e.g a diabetes database and an overweight database. By having several databases physically behind one and the same phone number the subscriber A can from one contact get information relating to several services or in this example to several diseases. A different code 4 provides access to a different record 5 (e.g. a different record of the same patient or a record if another patient).

When describing the embodiment, it is assumed by way of example that the data processing system 2 is in contact with a telephone switching centre of a fixed network PSTN (Public Switched Telephone Network) controlling the ending call so that an in-coming call, made to a specific number, first causes a database retrieval, however, marking the line, relating to the number, engaged. The call is connected to said number only after a successful retrieval. While the line is engaged, the calls made to the number, relating to it, are not answered.

The embodiment is discussed assuming by way of example that the subscriber device of the subscriber A is a mobile telephone 1A of the GSM system, having a standard user interface 1', and that an identifier 3 used is a telephone number MSISDN relating to a SIM card located in the mobile telephone. The identifier 3 can also be some other identifiable subscriber identifier 3 in the GSM system. The GSM system and its services have been described in more detail, e.g., in the book "The GSM System for Mobile Communications", M. Mouly, M. B. Pautet, Palaseau, France, 1992, ISBN: 2-9507190-0-7 and, therefore, it will not be discussed in more detail in this connection. The subscriber device can also be a telephone 1B or other corresponding device connected to a fixed network.

When describing the embodiment, it is assumed by way of example that the user of the data processing system 2 is the subscriber A's family doctor.

In order to establish a telecommunication connection, the subscriber A calls from his mobile telephone, through a public land mobile network (PLMN), the doctor's direct number. If the doctor is not engaged, a telecommunication connection is established and the data processing system 2 receives the identifier 3 MSISDN of the subscriber A. At this point, the doctor himself does not yet know about the connection, but his telephone line is engaged. The data processing system receives, from the subscriber A, a code 4 ABC as presented above.

The data processing system retrieves, from the database 7, the information, contained in the correct location 5, with the help of the identifier 3 and the code 4. In this case, these are the data of a person 1. In the case, illustrated in FIG. 2, the subscriber A could get the data of a person 2 retrieved by giving a code DEF. If the subscriber A had accidentally given a code ABE, the database would not have opened at all but, instead, the data processing system would have told the subscriber A that the retrieval of information had failed, the connection would have been disconnected (or connected to a Helpdesk), and the doctor's telephone line would have been free for the next contact. The doctor's other work would not have been disturbed, because he himself would have been unaware of the unsuccessful contact or that his telephone had been engaged.

When the data have been retrieved, the doctor is informed of the telecommunication connection, because the data processing system 2 transmits, to his user interface 8, the data of the person 1. The user interface includes a terminal with a display and a telephone. The doctor informs the subscriber A that the data 5 were successfully retrieved after which the doctor and the subscriber A discuss about the health of the person 1. The doctor inputs new data into the data processing system 2 through the user interface 8.

When the doctor and the subscriber A have sorted out the matter, the connection is disconnected and the doctor's telephone line is again free for the next request for contact. The data processing system 2, connected with a patient database, can be designed so that it detects if the retrieved information has been changed or added to, in which case it automatically updates the processed data in the correct location 5 in the database 7, in this case, the data of the person 1. The data processing system can also ask the user whether or not the data should be updated in the database 7.

The presentation above, with the relating figures, should only be considered illustrative of the present invention. It is obvious to persons skilled in the art that the invention can also be implemented in another form without deviating from the characteristics and the scope of protection of the invention presented in the enclosed claims.

What is claimed is:

1. A system for retrieving information from a database, the system comprising:

a subscriber device of subscriber A for establishing a telecommunication connection and for managing communication during it, the device containing a user interface for displaying messages received from a data processing system of a subscriber B and for responding to them;

the data processing system of the subscriber B for responding to a request for contact of the subscriber device of the subscriber A, the data processing system containing the database or being in contact with it, and the data processing system comprising means for receiving an identifier of the subscriber A;

wherein the database comprises data relating to a number of different services and service users, data related to one of the users of one of the services being identified by the identifier of the subscriber A and a predetermined code (4);

wherein the data processing system comprises means for receiving the predetermined code from the subscriber A and means for retrieving data relating to said one service and said one user from the database on the basis of the identifier of the subscriber A and the predetermined code; and wherein the database is a patient database and that the data processing system of the subscriber B comprises a user interface for transmitting the information, retrieved from the patient database, to a user of the data processing system and for updating the information, in the database, input by the user.

2. A system for retrieving information from a database, the system comprising:

a subscriber device of a subscriber A for establishing a telecommunication connection and for managing communications during it, the device containing a user interface for displaying messages received from a data processing system of a subscriber B and for responding to them; and the data processing system of a subscriber B for responding to a request for contact of the subscriber device of the subscriber A, the data processing system containing the database or being in contact with it, and the data processing system comprising means for receiving an identifier of the subscriber A;

wherein the database comprises data relating to a number of different services and service users, data related to one of the users of one of the services being identified by the identifier of the subscriber A and a predetermined code, wherein the data processing system comprises means for receiving the predetermined code from the subscriber A and means for retrieving data relating to said one service and said one user from the database on the basis of the identifier of the subscriber A and the predetermined code, wherein said database further comprises a first data relating to a first user and a second data relating to a second user, wherein said first data is identified by a first identifier of the subscriber A and a first predetermined code, wherein said second data is identified by said first identifier of the subscriber A and a second predetermined code, said second predetermined code differing from said first predetermined code, wherein said means for retrieving data has been arranged to identify the data related to said first user on the basis of a combination of said first identifier of the subscriber A and said first predetermined code, and wherein said means for retrieving data has been arranged to identify the data related to said second user on the basis of a combination of said first identifier of the subscriber A and said second predetermined code.

3. A system according to claim 2 wherein the data processing system further comprises a system for transmitting a message to the subscriber A, the message showing whether the data was successfully or unsuccessfully retrieved.

4. A system according to claim 2 wherein the database is a patient database and that the data processing system of the subscriber B comprises a user interface for transmitting data retrieved from the patient database, to a user of the data processing system and for updating the information, in the database, input by the user.

5. A system according to claim 2 wherein the data processing system has means for informing said user only after the retrieved data has been transmitted that a connection has been established to a subscriber device.

6. A system according to claim 2 wherein the subscriber device utilizes wireless communication.

7. A system according to claim 6 wherein the subscriber device is a mobile station and the identifier is an identifier relating to a Subscriber Identity Module (SIM) card or an equivalent.

8. A method for retrieving information from a database, comprising steps of:

establishing a telecommunication connection with a subscriber A as a response to a request transmitted from the subscriber A;

receiving at least one identifier of the subscriber A;

receiving at least one predetermined code from the subscriber A; and retrieving data from the database in response to receiving at least one predetermined code and the identifier of Subscriber A, wherein the database comprises data relating to at least one service and at least one service user, wherein data related to at least one of the service users of at least one of the services being identified by the identifier of the subscriber A and a predetermined code, wherein the step of retrieving data from the database in response to receiving at least one predetermined code and the identifier of Subscriber A is further comprised of the steps of:

retrieving data identified in the database by a first predetermined code and a first identifier of Subscriber A from the database in response to receiving the first predetermined code and the first identifier of Subscriber A; and retrieving data identified in the database by a second predetermined code and the first identifier of Subscriber A from the database in response to receiving the second predetermined code and the first identifier of Subscriber A.

9. A method according to claim 8, wherein a message, showing whether the retrieval of information was successful or unsuccessful, is transmitted to a subscriber device of a subscriber A and that, after a successful retrieval of information, retrieved information is transmitted to be displayed on a display terminal of a user interface of a data processing system.

10. A method according to claim 8, wherein the telecommunication connection is established utilizing a wireless communication connection.

11. A method according to claim 10, wherein the wireless communication connection utilizes a mobile communication system.

* * * * *